United States Patent [19]
Solomon

[11] 3,893,175
[45] July 1, 1975

[54] RECORDER FOR MONITORING COPIERS

[75] Inventor: Abby R. Solomon, Rochester, N.Y.

[73] Assignee: Xerox Corporation, Stamford, Conn.

[22] Filed: Mar. 26, 1973

[21] Appl. No.: 344,781

[52] U.S. Cl. .................. 360/6; 235/150; 340/172.5
[51] Int. Cl. ...................... G01d 9/06; G11b 13/00
[58] Field of Search ............... 346/33 M, 50, 74 M; 355/112; 340/172.5; 360/6

[56] References Cited
UNITED STATES PATENTS

| | | | |
|---|---|---|---|
| 2,987,366 | 6/1961 | Meyers | 346/50 |
| 3,059,238 | 10/1962 | Quinn | 346/50 |
| 3,461,429 | 8/1969 | Gray | 346/33 M |
| 3,500,431 | 3/1970 | Baskin | 346/74 M |

Primary Examiner—Vincent P. Canney
Assistant Examiner—Jay P. Lucas

[57] ABSTRACT

An automatic recorder for copiers adapted to monitor certain selected functions and components of the copier, and, in response to certain occurrences within the copier and/or the recorder, to record certain of the data accumulated from such monitoring. The recorder includes clock means for pinpointing the time at which the event prompting the recording of data occurred, together with counting means for tolling certain operational functions within the copier. To prevent unwarranted shutdown of the recorder, an auxiliary power source is provided. And where the recorder is capable of recording plural blocks of data in response to the occurrence of divergent events in the copier, there is included means to inhibit simultaneous recording of more than one data block at a time.

11 Claims, 7 Drawing Figures

RECORDER FOR MONITORING COPIERS

This invention relates to copiers, and more particularly to an apparatus for recording copier functions.

In recent years, the number of copier/duplicators in the field has grown by leaps and bounds. In addition, both the complexity and speed of the copiers has increased, and today many copiers incorporate a variety of auxiliary equipment such as sorters, automatic document handlers, and the like, for such therewith.

With this growth in copier population and complexity, it is becoming increasingly difficult to measure accurately the performance and customer use patterns of copiers in the field. Yet data complications on such diverse matters as numbers and types of shutdown, type of run/length, usage and application, number of copy cycles and copies run in each cycle, number and types of paper jams, use of accessories and number of accessory problems, and so forth is highly desirable for use in determining market trends, machine and customer usage cycles, pinpointing service and design problems, identifying customer types, revenue patterns, and so forth.

While informatin of this type may be gathered in rather laborious fashion by means of customer questionnaires, service sheets, interviews, tests, etc., the cost in terms of time and manpower for this information is extremely high, and this in turn limits the number and type of information checks that can be made so that the overall accumulation of data is on a relatively narrow base. In addition, the data is most efficaciously used if it can be analyzed by computer. This means that data accumulated by questionnaires, interviews, etc. must undergo the further step of being programmed for computer ingestion.

It is a principal object of the present invention to provide a new and improved recorder for copiers.

It is a further object of the present invention to provide an automatic recorder designed to permanently record data reflecting operation of a copier in the sequence in which such copier operations occur.

It is a further object of the present invention to provide a recorder for use with copiers to unobtrusively monitor and record selected information reflectong copier operating cycles and problems and associating such information in a time frame for identification purposes.

It is a further object of the present invention to provide an improved multi-channel recorder for use with copiers having a data storage unit directly readable by a computer.

This invention relates to a recorder for use in conjunction with a copier comprising, in combination, a magnetic tape; a recording head for recording real time operating characteristics of the copier on the tape; means to monitor certain copier operating characteristics in real time sequence, the monitor means providing recordable data indentifying the copier operating characteristics being monitored as they occur; data storage means for storing the data pending recording thereof; and control means adapted on the occurrence of a predetermined event in the copier to release at least one block-like portion of the data stored in the data storage means to the recorder head for recording thereof on the tape.

Other objects and advantages will be apparent from the ensuing description and drawings in which.

Figure 1A:
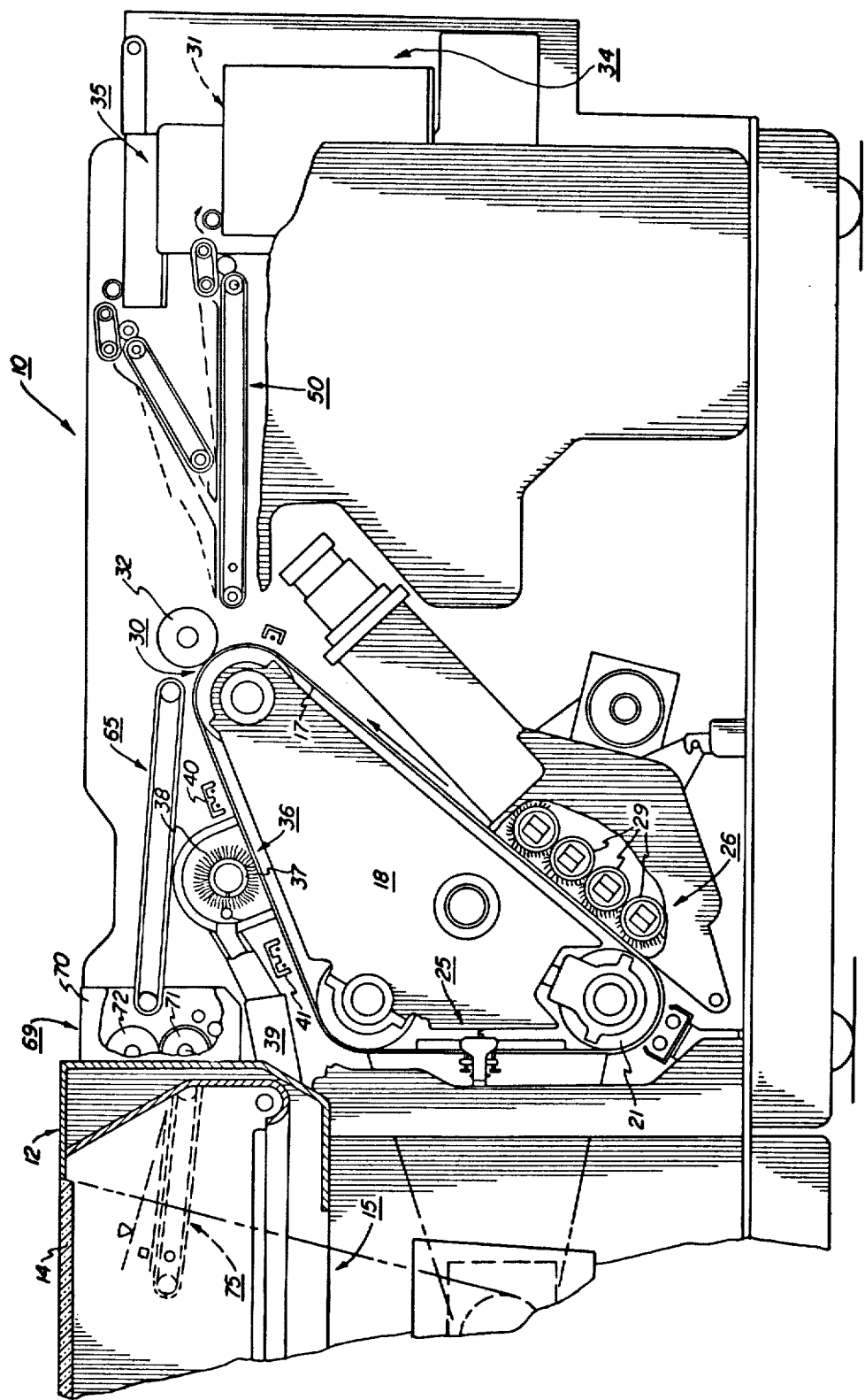
FIG. 1a therof illustrating the copier per se and FIG. 1b the copier output.
Figure 1B:
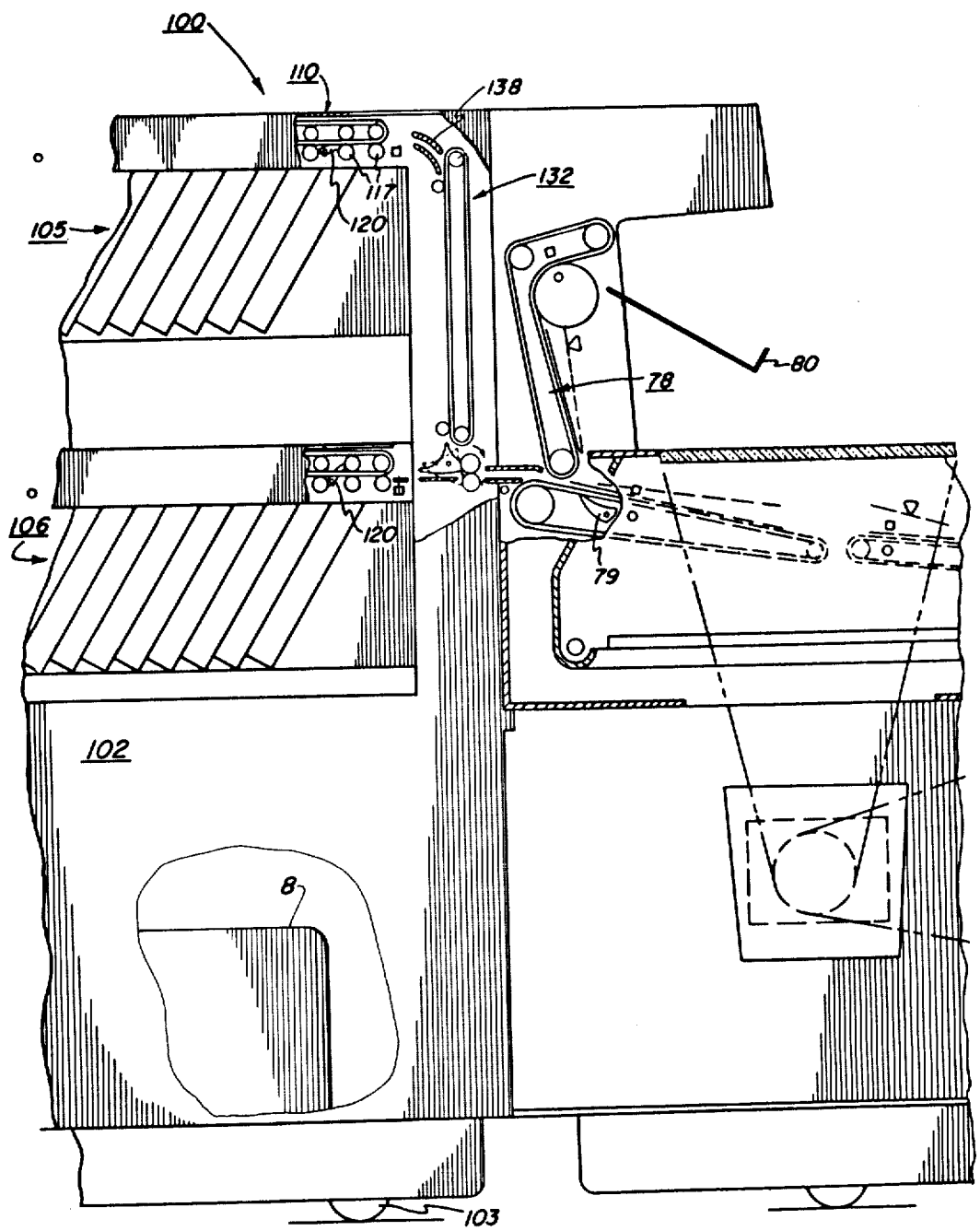
FIG. 1 is schematic sectional view of an exemplary copier machine of the type with which the recorder of the present invention may be used.
Figure 2:
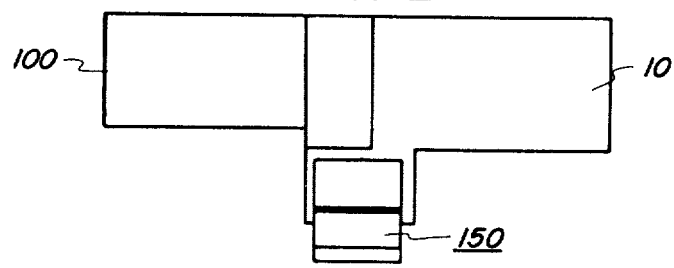
FIG. 2 is a top view of the copier shown in FIG. 1.

Referring particularly to FIGS. 1 and 2 of the drawings, an exemplary copier/reproduction machine, designated generally by the numeral 10, and incorporating the recorder 8 of the present invention, is shown. The copier 10 includes a sorter 100 and automatic document handler 150. As will appear, recorder 8 serves to record certain data reflecting the operational status and characteristics of copier 10 for further analysis.

As in all electrostatic systems such as the xerographic type machine illustrated, a light image of a document to be reproduced is projected onto the sensitized surface of a xerographic plate to form an electrostatic latent image thereon. Thereafter, the latent image is developed with an oppositely charged developing material to form a xerographic powder or toner image, corresponding to the latent image on the plate surface. The toner image is then electrostatically transferred to a support surface where it is fused by a fusing device so that the toner image is permanently adhered to the support surface.

In the copier 10, an original document 12 to be copied is placed upon a transparent platen 14 fixedly arranged in an illumination assembly, generally indicated by the reference numeral 15, and disposed at one end of the copier 10. While upon the platen, the document 12 is illuminated, thereby producing image rays corresponding to the informational areas on the original. The image rays are projected by means of an optical system onto the photosensitive surface of a xerographic plate at an exposure station 25 to produce an electrostatic latent image thereon. In the exemplary copier/reproduction machine 10, the xerographic plate is in the form of a flexible photoconductive belt 17 supported in a belt assembly 18.

The electrostatic image is carried on belt 17 from exposure station 25 through developing station 26 where the latent electrostatic image is developed by means of toner through the use of a multiple magnetic brush system 29. From developer station 26, the now developed image on belt 17 moves to transfer station 30 where the developed image is transferred to a support surface, normally a sheet of copy paper 31, brought from either main or auxiliary paper trays 34 or 35, respectively. The copy sheet 31 passes between transfer roller 32 and belt 17 at transfer station 30 at a speed substantially equal to the speed of belt 17, transfer taking place by means of electrical bias on transfer roller 32 in a manner understood by those skilled in the art.

Following transfer, the belt 17 is cleaned in preparation for the next image at cleaning station 36. There, a suitable cleaning brush 37 housed on vacuum chamber 38 removes residual toner, the toner being drawn from chamber 38 by vacuum through line 39 for deposit in a suitable collecting place (not shown). To assist cleaning, a cleaning corotron 40 is provided upstream of vacuum chamber 38.

Following cleaning of belt 17, the belt 17 is once again charged as by charging corotron 41 in preparation for the next image.

Photoconductive belt 17 comprises a photoconductive layer of selenium, which is the light receiving surface and image medium for the apparatus, on a conductive backing. Further details regarding the structure of the belt assembly and its relationship with the machine and support therefor may be found in the copending application Ser. No. 102,312 filed Dec. 29, 1970, now U.S. Pat. No. 3,730,623 issued May 1, 1973.

Copy sheets 31 are supplied from either main paper tray 34 or auxiliary paper tray 35 by a suitable paper supply transport 50, which carries the sheets 31 forward to transfer roll 32.

Transfer roll 32 is provided with a suitable bias designed to electrostatically attract and attach sheets 31 thereto. In this way, the sheets 31 discharged from main supply transport 50 are carried by transfer roller 32 past belt 17 and in spaced but operative relationship therewith to a vacuum transport 65. Vacuum transport 65 carries the image bearing sheets to fuser 69. Fuser 69 includes a suitable housing 70 within which is disposed a lower heated fuser roll 71 and an upper pressure roll 72, rolls 71, 72 cooperating to form a nip through which the image bearing copy sheets 31 pass and the image thereon permanently fixed. Sheets 31 leaving fuser 69 are carried by intermediate copy output transport 75 to copy output transport 76 and from transport 76 to either copy discharge transport 78 or to the inlet of sorter 100. Where sorter 100 is not in use or where no sheet handling device is provided, a blocking gate 79 serves to route all copies onto discharge transport 78. Discharge transport 78 carries the copies to output tray 80.

Sorter 100 includes a suitable frame 102 in which upper and lower rows of copy bins 105, 106 are supported. Bins 105, 106, which are downwardly inclined, serve to receive and hold copies being sorted and which are received via an opening in the top. Transports 110, above the bins 105, 106, cooperate with idler rolls 117 and deflectors 120 to feed the sheets into selected ones of the bins 105, 106. To move copy sheets to the upper bin 105, a suitable transport 132 is provided. A curved paper guide pair 138 serves to turn the copy sheets leaving transport 132 through an arc of approximately 90° to upper bin transport 110.

Figure 3:
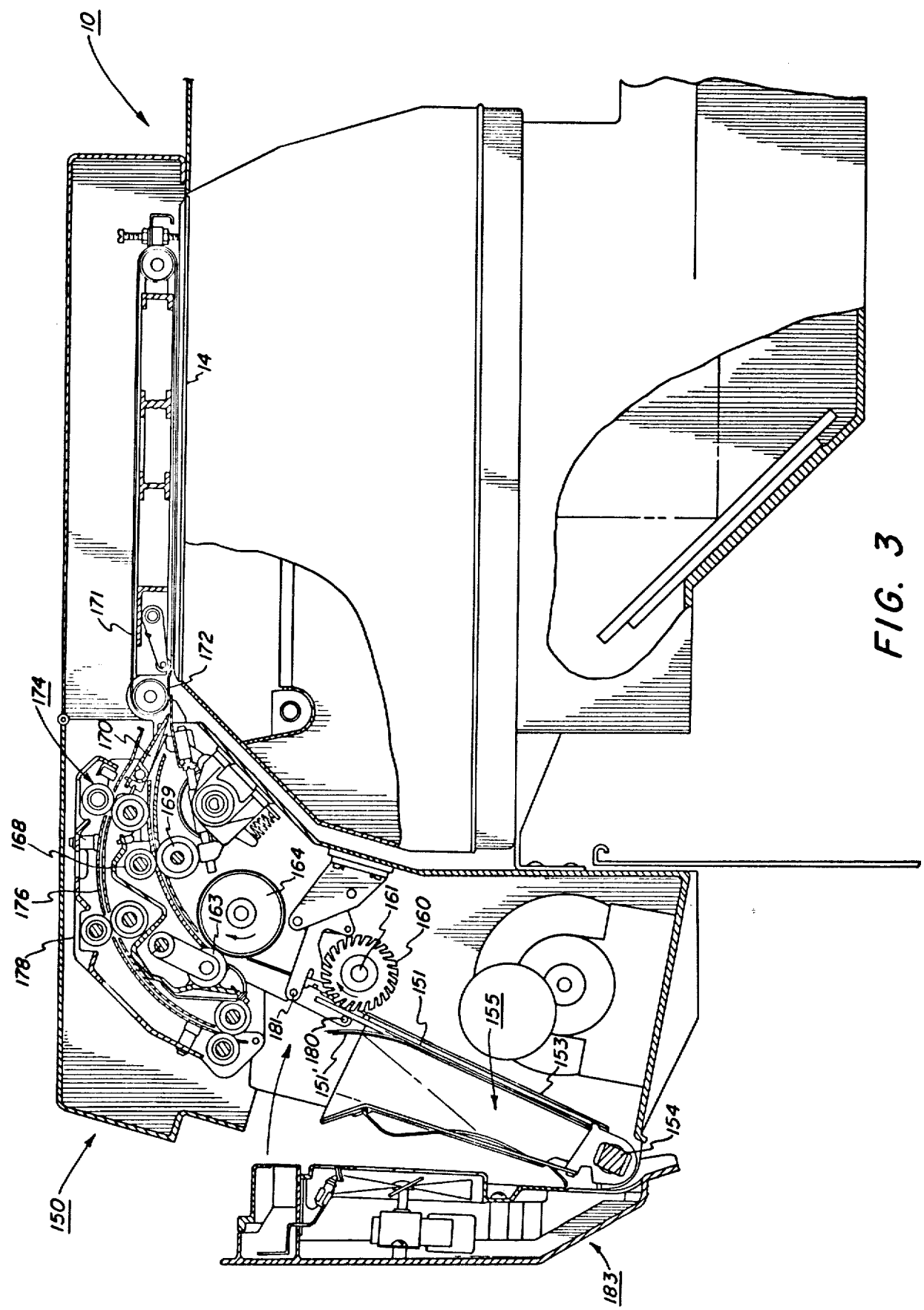
FIG. 3 is an enlarged sectional view of the automatic document handler for the copier shown in FIG. 1.

In the exemplary arrangement shown, an automatic document handler, designated generally by the numeral 150 and seen best in FIG. 3, is provided. Document handler 150 serves to feed one original document at a time from a supply of documents 151 into copying position on platen 14 of copier 10 where a copy or series of copies may be made. Following copying, each document is automatically returned to the document supply 151 and the next document, if any, is brought into copying position on platen 14. As will appear, documents returned to supply 151 may be recycled by handler 150 or simply removed by the user when the copying program is completed.

Document handler 150 includes an inclined base section 153, on which a document tray 155 is pivotally supported. A portion of the base of tray 155 is cut away at the upper end thereof to accommodate primary document feeder roll 160. Feeder roll shaft 161 is suitably supported for rotation and driven by suitable means (not shown) in the direction shown by the solid line arrow of FIG. 3.

A pair of document limiting rolls 163, 164 are disposed on the downstream side of feeder roll 160, rolls 163, 164 functioning to prevent passage of more than one document at a time.

Documents emerging from limiting rolls 163, 164 are carried forward by intermediate transport rolls 168, 169 underneath curved document guide fingers 170 to platen transport 171. Transport 171, which may comprise a belt-type conveyor, carries the document onto the platen 14 of copier 10. A register edge 172 is provided across the inlet side to platen 14, edge 172 serving to register or locate the documents in pre-set position on platen 14 for copying thereof. Platen transport 171 is reversed for this purpose after the document has been carried past register 172, reversal of transport 171 serving to move the document backwards to bring the document trailing edge into abutment with register edge 172. When copying is completed, platen transport 171, is again operated in reverse to carry the document backwards off platen 14, register edge 172 being retracted for this purpose by a suitable means (not shown). The document guide fingers 170 deflect or guide the returning document upwardly into the nip of a first returned transport roll pair 174, roll pair 174 carry the returning document between suitable return guides 176 and into the nip of a second return transport roll pair 178 which carry the document back into tray 155.

To maintain the returned documents, which have been designated for convenience by the numeral 151', segregated from documents 151 awaiting feeding and prevent inadvertant refeeding of returning documents 151 by the primary feeder roll 160 following feed of the last one of the original documents 151, a displaceable bail or separator bar 180 is provided substantially opposite to and above feeder roll 160. Bail 180 is supported from a rockable cross shaft 181. Suitable means (not shown) are provided to selectively turn cross shaft 181 and raise bail 180 out from under documents 151 resting thereupon and thereafter return bail 180 back onto the topmost one of the documents.

To help guide the returning documents into the document tray, as well as prevent documents from falling out of the tray, particularly when bail 180 is raised, a tray cover 183 is provided. Cover 183 is supported on the shaft 154 to enable the cover 183 to be opened for access to the document tray 155 as with loading or unloading documents.

Copier 10 is provided with a suitable programmable control circuit (not shown) or logic which is settable by the operator for the number of copies to be made. In addition, selector controls are provided to enable the operator to operate copier 10 alone, or in combination with sorter 100, or in combination with document handler 150, or in combination with both together. It is understood that selecting either or both sorter 100 and/or document handler 150 activates circuits which integrate operation of copier 10 with either or both of these accessories.

Copier 10 includes a suitable print-start control, normally a print button for use by the operator in starting the copying cycle. Normally, the operator first sets or programs the number of copies to be made, loads the document handler 150 with the original or originals to be copied, and then actuates the aforementioned print button.

Copier 10 normally stops on completion of the program on signals from a suitable copy counter. In addition, however, copier 10 may stop before completion of the copy cycle programmed in the event of a malfunction, i.e., on a paper jam or an overtemperature condition in fuser 69, or other malfunction.

As apparent from the preceding description, copier 10 comprises a relatively complex apparatus. In order to monitor and record for later analysis and digestion operations and functions occurring in copier 10 over a period of time, the recorder 8 of the present invention is provided.

Figure 4:
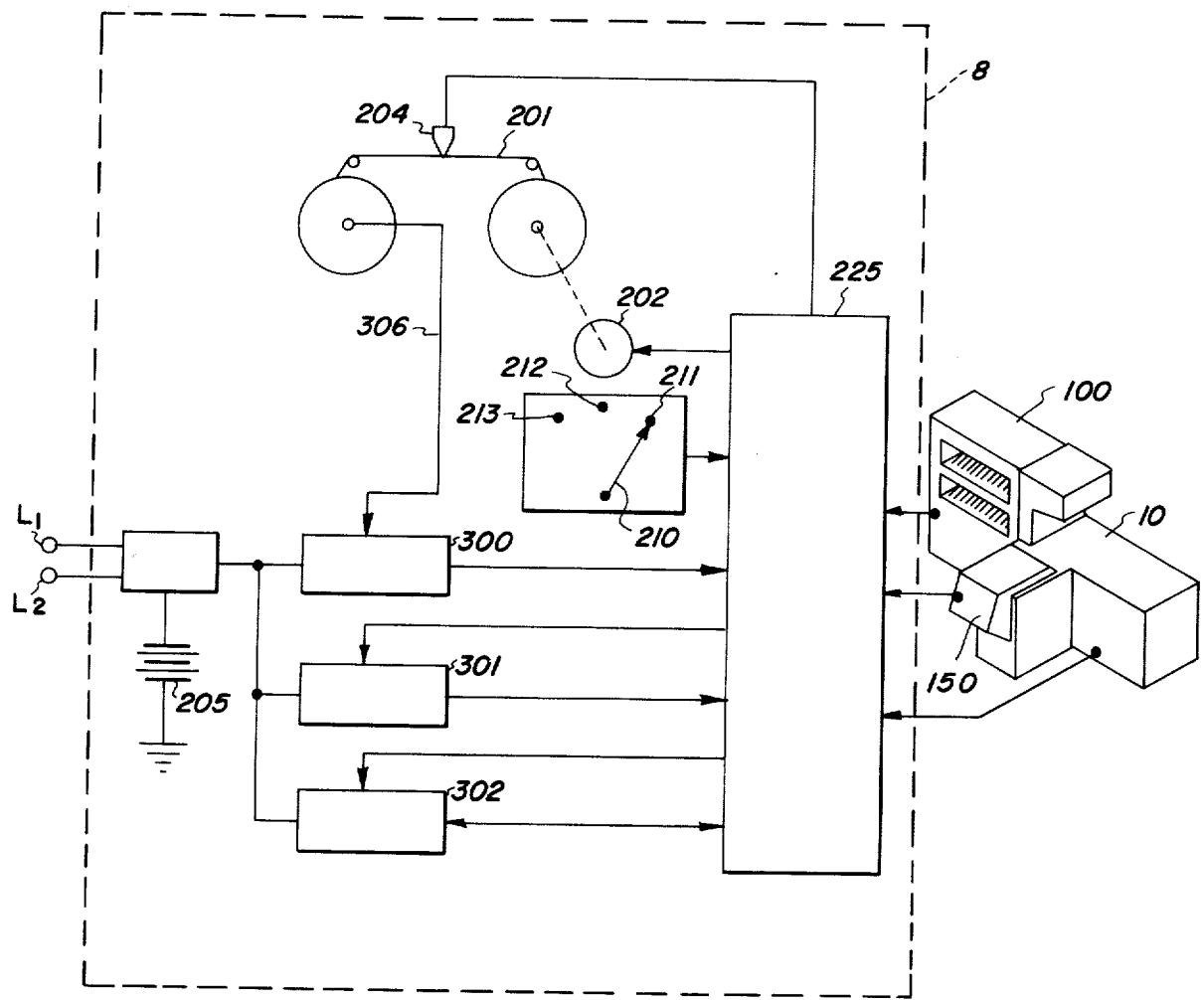
FIG. 4 is a schematic view of the recorder of the present invention.

Referring now to FIG. 4 of the drawings, recorder 8 includes a suitable recording device, such as magnetic tape unit 201, tape drive motor 202, and magnetic write head 204. The tape supply for tape unit 201 is preferably in the form of a removable cassette.

Recorder 8 also includes a pair of clocks 300, 301 which are used to provide a time frame for the events being monitored in copier 10. In the exemplary arrangement shown, clock 300 is relied on to toll total operating time of recorder 8 beginning from the instant recorder 8 is started (normally when a fresh tape cassette is inserted) until the recorder is stopped (normally when the completed cassette is removed). During this period, clock 300 identifies, preferably in tenths of a second, the real time sequence in which the events being monitored occur, for example, the time at which a paper jam occurred. The second clock 301 may be used to provide relative time between certain events as they occur in copier 10. In the exemplary arrangement, clock 301 is used to time the individual copying cycles. It will be understood that additional clock mechanisms or clock functions may be provided.

Recorder 8 in addition includes a suitable multi-channel counter 302 which may be used to record the number of times certain events occur in copier 10, and on a predetermined signal or predetermined total to record the counter number of tape 201. It is understood that individual counters may be used instead of the multi-channel counter 302.

Power for recorder 8 comprises a standard alternating current source $L_1$, $L_2$. To assure sustained operation of recorder 8 in the event the line cord is inadvertently disconnected, or other power failure, a back up battery 205 is provided. Battery 205 is circuited to drive recorder 8 whenever power from the standard source $L_1$, $L_2$ is interrupted.

As described earlier, recorder 8 preferably incorporates a cassette tape supply, and suitable circuit means are provided such that installation of the tape supply cassette generates a start signal 306 for clock 300. Preferably, the signal 306 serves to initialize or reset clock 300 to zero at startup. Following insertion of the tape supply cassette, clock 300 thereafter operates continuously until the tape 201 is removed.

To enable servicing periods for copier 10 to be distinguished during the recording period, a manually operably mode switch 210 is provided. In the arrangement shown, mode switch 210 has a first position 211 to indicate normal recording operation, and a second position 212 to indicate when copier is undergoing servicing. A third switch position 213 may be provided to accomodate some other special situation. As will appear hereinafter, a record is made on tape 201 each time switch 210 is reset.

Figure 5A:
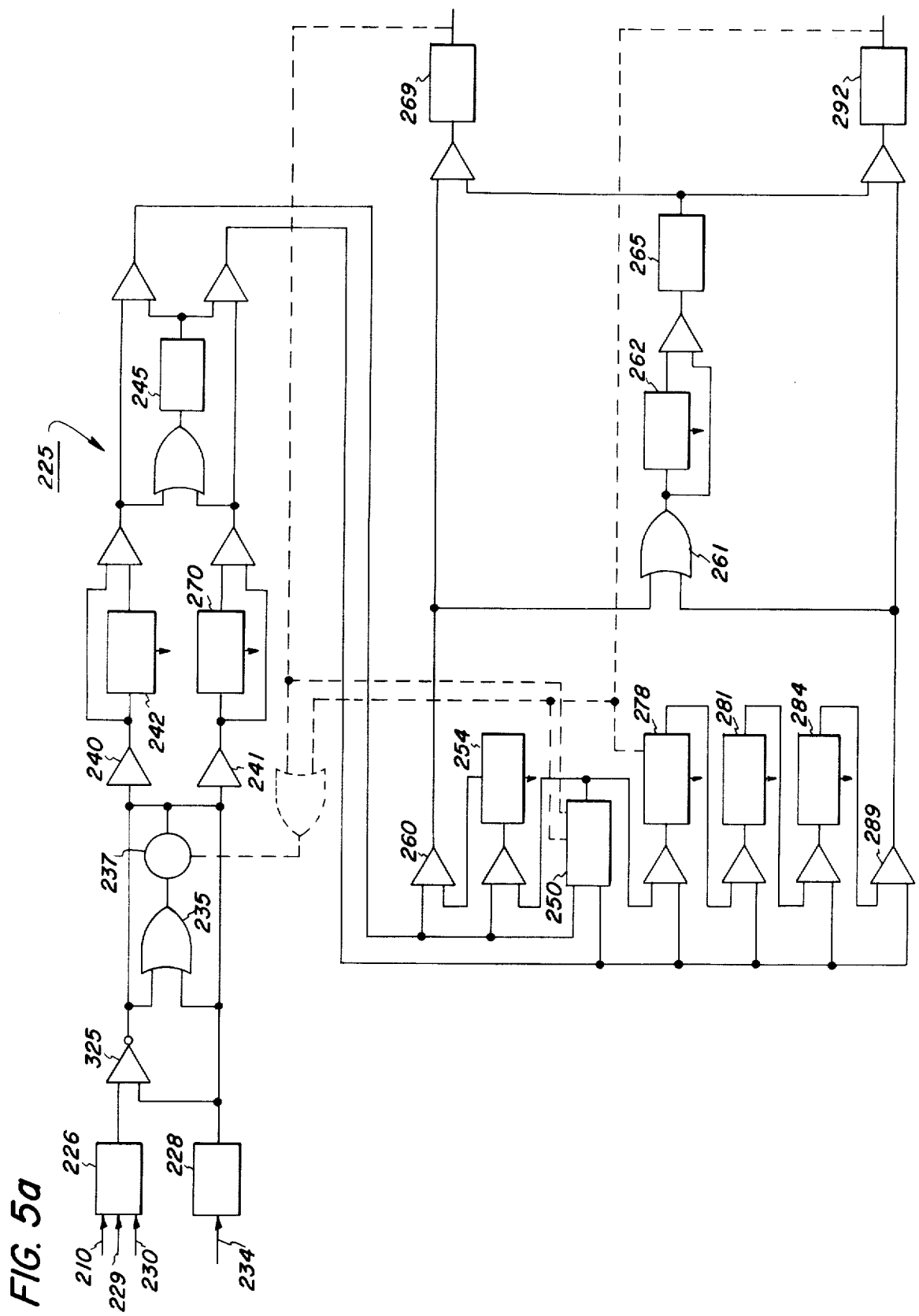
FIG. 5 is a schematic circuit diagram of the interface between the recorder of the present invention and the coper shown in FIG. 1, FIG. 5a thereof illustrating the data block recording control and FIG. 5b thereof illustrating the recorder data blocks.
Figure 5B:
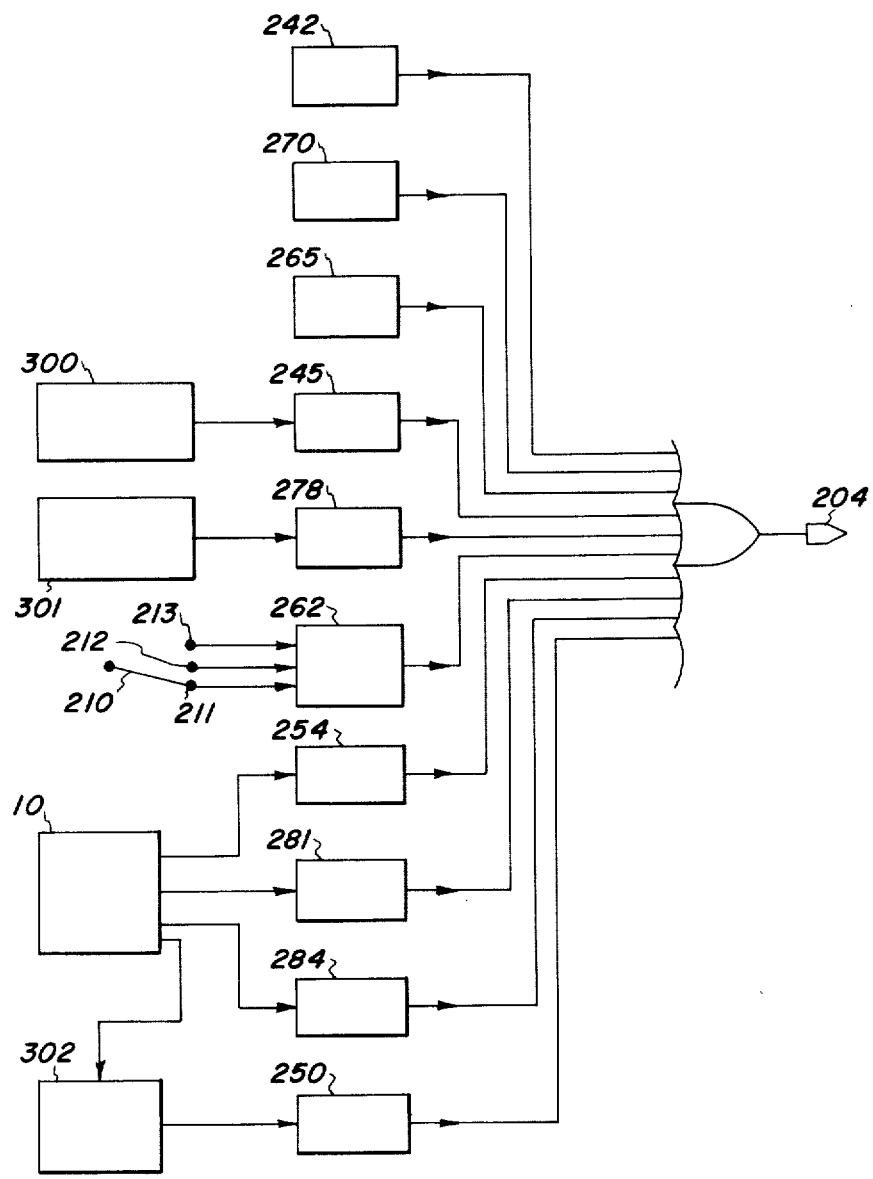

Recorder 8 is interfaced or connected with copier 10 by a suitable interface circuit 225 shown schematically in FIGS. 5a and 5b. As will appear, circuit 225 performs the functions of monitoring certain selected operational events in copier 10 as they occur and storing, i.e., remembering, the data until such time as recorder 8 is actuated. In discussing FIGS. 5a and 5b, it should be understood that the recorder 8 is arranged to record the data accumulated in discrete groups or blocks, two of which are discussed herein. The data may, however, be recorded in a single block or in as many discrete blocks as may be desired. Each data block herein consists of certain predetermined operational information or data about copier 10 together with timing data from real time clock 300 identifying the time at which the event prompting recording of the particular data block occurred together with indicia identifying the particular data block being recorded. It will, however, be understood that the data making up each data block may vary and that timing data and/or block identifying indicia may be omitted.

In the arrangement shown, recording of the individual data blocks is controlled by circuits 226 and 228. It will be understood that circuits 226 and 228 may respond to any event or series of events as may be desired. In the exemplary arrangement shown, circuit 226 is triggered in response to re-setting of mode switch 210, to turning of power to the copier 10 on or off (represented by signal 229), or on counter 302 or one channel thereof approaching its count capacity (represented by signal 230). Circuit 226 may also respond to various other events, for example, switching sorter 100 or document handler 150 on or off, etc.

Circuit 228, in the exemplary illustration, responds to termination of any copying cycle (represented by signal 234). Termination of a copying cycle may be normal, that is when the last copy programmed is completed, or abnormal, as for example, on a paper jam, loss of paper supply, fuser overtemperature, etc. Circuit 228 may of course be actuated in response to other events.

Suitable data storage and write circuits are provided to monitor certain functions and/or operations in copier 10, these circuits serving to generate recordable data reflecting the function being monitored. Of those circuits, circuit 254, termed the optional data write circuit, is associated with control circuit 226 and monitors selected copier functions, i.e., use of document handler 150, etc. Circuit 281, which is associated with control circuit 228, monitors those copier conditions and events which result in termination of the copying cycle, i.e., completion of the copy run programmed, paper jam, fuser overtemperatures, etc. Circuit 281 is referred to herein as the termination identification write circuit. Circuit 284, the machine state detector write circuit, generates data reflecting the operating state of the copier components, i.e., the operation of developing station 26, and the like.

Referring to FIGS. 5a and 5b, the signal output of either circuit 226 or 228 when actuated triggers motor control circuit 237 to start the recorder motor 202. With motor 202 running and tape 201 moving, the signal from circuit 237 cooperates with the signal from actuated block control circuit 226 or 228 to enable AND circuit 240 or 241 associated therewith to initite the recording cycle.

Assuming circuit 226 is actuated, the signal from circuit 240 thereof triggers block identification circuit 242 to record on tape 201 an informational bit identifying the particular data block being recorded. A corresponding identification circuit 270 is provided for block control circuit 228.

Following recording of the block indentifying bit, the signal from cicuit 242 triggers clock write circuit 245 to record on tape 201 the time the event prompting the recording occurred. When the transmission of the clock data from circuit 245 is completed, a signal from circuit 245 triggers counter write circuit 250. The signal output of circuit 250, representing the count accumulated in all or preselected ones of the channels comprising counter 302, is fed to recording head 204 and recorded on tape 201. When recording of the data in counter 302 is completed, a signal from circuit 250 triggers option write circuit 254 to record any optional data as may have been monitored.

When recording of the data from circuit 254 is completed, a signal from circuit 254 triggers AND circuit 260, and the signal from circuit 260 to OR circuit 261 triggers mode write circuit 262 to record the particular operating mode of recorder 8 as represented by the setting of mode switch 210. When completed, the signal from circuit 262 triggers end of block write circuit 265 to record an end of the block indentifying bit.

This completes the data block controlled by circuit 226, and the signal from the end of block write circuit 265 is used to actuate reset circuit 269 and reset the appropriate channels of counter 302. At the same time, tape drive motor 202 is stopped.

Assuming block control circuit 228 is actuated in response to termination of a copying cycle, the signal from circuit 228 to OR circuit 235 starts recorder motor 202 as described earlier. Following this, the combined signals from circuits 228 and 237 trigger AND circuit 241 which in turn triggers block identification circuit 270 to identify the particular data block being recorded. When transmittal of the block identifying signal has been completed, the signal from circuit 270 triggers the write circuit 245 for clock 300 to record the time at which the copying cycle was terminated.

When recording of the time data from clock 300 is completed, the signal from circuit 245 triggers counter write circuit 250 to record, from certain preselected channels of counter 302, the number of copies made up to the point where the copying cycle terminated. When completed, the signal from circuit 250 triggers the clock write circuit 278 for clock 301 to record the length of time between start and termination of the copying cycle. Following this, the signal from circuit 278 triggers termination identification write circuit 281 to record data indentifying the reason for terminating the copying cycle. When completed, the signal from circuit 281 triggers machine state detector write circuit 284 to record data reflecting the condition or state of selected ones of the copying machine, sorter, and/or document handler components at the time the copying cycle was terminated.

When the data reflecting the copying machine state has been recorded, the signal from circuit 284 triggers AND circuit 289 to actuate, via OR circuit 261, mode write circuit 262 to record the recorder operating mode, and following this, to actuate end of block write circuit 265 to record the end of the data block on tape 201. Reset circuit 292 is then actuated to reset the appropriate channels of counter 302, clock 301, and stop tape drive motor 202.

To accomodate simultaneous actuation of both circuits 226, 228, as could occur, for example, where the data block controlled by circuit 228 is in the process of recording following termination of a copying cycle and power to copier 10 is interrupted as exemplified by signal 229, NAND circuit 325 is provided between the output gate of circuit 226 and input gates to circuits 235 and 240. The output gate of block circuit 228 is connected to a second input gate of circuit 325. In the event of an output signal from circuit 228, NAND circuit 325 assumes a blocking condition to prevent transfer of an output signal from circuit 226 should circuit 226 be actuated during this period.

While the invention has been described with reference to the structure disclosed, it is not confined to the details set forth, but is intended to cover such modifications or changes as may come within the scope of the following claims.

What is claimed is:

1. Recording apparatus for use in collecting information about customer copier usage patterns and copier failure and operational patterns for subsequent analysis, comprising:
    an on-line recorder including a magnetic tape and a recording head for recording real time operating characteristics of the copier on said tape;
    means to monitor certain of said copier operating characteristics in real time sequence, the monitor means providing recordable data identifying the copier operating characteristics being monitored as they occur;
    data storage means for storing said data pending recording thereof; and
    control means adapted on the occurrence of a predetermined recording event in said copier to release at least a block-like portion of the data stored in said data storage means to said recorder head for recording thereof on said tape.

2. The recorder according to claim 1 including means to clear the portion of said data storage means in which said block of data was stored following recording thereof.

3. The recorder according to claim 1 including clock means to toll real time operation of said recorder, and clock control means adapted on the occurrence of said predetermined copier event to actuate said clock means and provide timing data identifying the time at which said predetermined recording event occurred.

4. The recorder according to claim 1 in which said control means includes means to prevent simultaneous recording of more than one block of data at a time.

5. The recorder according to claim 1 in which said recorder includes means to generate data identifying the specific block of data being recorded.

6. The recorder according to claim 1 in which said monitor means includes at least one counter, said counter being adapted on reaching a preset count to actuate said control means.

7. The recorder according to claim 1 in which said monitor means includes signal generating means for identifying data recorded during servicing of said copier.

8. The recorder according to claim 7 including means to actuate said control means in response to starting or terminating of servicing of said copier.

9. The recorder according to claim 1 including means responsive to termination of each copying cycle to actuate said control means.

10. The recorder according to claim 1 including means responsive to a change in power input to said copier to actuate said control means.

11. The recorder according to claim 1 in which said monitoring means includes elapsed time clock means to provide data indicative of the length of each copying cycle in said copier.

* * * * *

UNITED STATES PATENT OFFICE
CERTIFICATE OF CORRECTION

PATENT NO. : 3,893,175
DATED      : July 1, 1975
INVENTOR(S) : Abby R. Solomon

It is certified that error appears in the above-identified patent and that said Letters Patent are hereby corrected as shown below:

Column 1, line 10, delete "such" and insert -- use --.

Column 1, line 14, delete "complications" and insert -- compilations --.

Column 1, line 24, delete "informatin" and insert -- information --.

Column 1, line 44, delete "reflectong" and insert -- reflecting --.

Signed and Sealed this twenty-eight Day of October 1975

[SEAL]

Attest:

RUTH C. MASON
Attesting Officer

C. MARSHALL DANN
Commissioner of Patents and Trademarks